(12) United States Patent
Niyogi

(10) Patent No.: US 6,777,484 B2
(45) Date of Patent: Aug. 17, 2004

(54) POLYPROPYLENE GRAFT COPOLYMER/ FLUORINATED POLYOLEFIN BLENDS

(75) Inventor: Suhas G. Niyogi, Hockessin, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/924,254

(22) Filed: Aug. 8, 2001

(65) Prior Publication Data

US 2003/0040577 A1 Feb. 27, 2003

(51) Int. Cl.$^7$ .............................................. C08L 27/00
(52) U.S. Cl. ....................................... 524/504; 525/72
(58) Field of Search .............................. 525/72; 524/504

(56) References Cited

U.S. PATENT DOCUMENTS

| | | | |
|---|---|---|---|
| 3,868,433 A | 2/1975 | Bartz et al. ............. 260/876 R |
| 4,767,821 A | * 8/1988 | Lindner et al. | |
| 4,945,130 A | * 7/1990 | Genz et al. | |
| 5,034,460 A | 7/1991 | Nishioka ..................... 525/72 |
| 5,077,337 A | 12/1991 | Atwell et al. ................. 525/72 |
| 5,140,074 A | 8/1992 | DeNicola, Jr. et al. ..... 525/263 |
| 5,188,873 A | 2/1993 | Delannoy ................ 428/36.92 |
| 5,212,246 A | 5/1993 | Ogale ......................... 525/240 |
| 5,219,931 A | 6/1993 | Siol et al. ...................... 525/63 |
| 5,286,791 A | 2/1994 | DeNicola, Jr. et al. ....... 525/71 |
| 5,302,454 A | 4/1994 | Cecchin et al. ............. 428/402 |
| 5,380,802 A | 1/1995 | Termine et al. ............... 525/72 |
| 5,409,992 A | 4/1995 | Eppert, Jr. .................... 525/88 |
| 5,411,994 A | 5/1995 | Galli et al. ................. 521/50.5 |
| 5,549,948 A | 8/1996 | Blong et al. ............... 428/36.9 |
| 5,898,051 A | 4/1999 | Kawashima et al. .......... 525/71 |
| 6,046,273 A | 4/2000 | Syed ........................... 525/71 |

FOREIGN PATENT DOCUMENTS

WO  0008078  2/2000

\* cited by examiner

*Primary Examiner*—Jeffrey Mullis

(57) ABSTRACT

The thermal stability of graft copolymers can be improved by blending (1) a graft copolymer comprising a backbone of a propylene polymer material having graft polymerized thereto a monomer selected from the group consisting of (a) an ester of an acrylic acid substituted at the alpha carbon atom by a 1–3 alkyl group and (b) a combination of (i) an ester of an acrylic acid substituted at the alpha carbon atom by a 1–3 alkyl group and (ii) an ester of an unsubstituted acrylic acid, or an acrylic acid substituted at the alpha carbon atom by a 1–3 carbon alkyl group and (2) about 1 weight % to about 25 weight % of a fluorinated olefin polymer, wherein the ratio of the polymerized monomer to the fluorinated olefin polymer is about 25:1 to about 0.5:1.

15 Claims, No Drawings

POLYPROPYLENE GRAFT COPOLYMER/FLUORINATED POLYOLEFIN BLENDS

FIELD OF THE INVENTION

This invention relates to compositions comprising polyolefin graft copolymers and fluorinated olefin polymers.

BACKGROUND OF THE INVENTION

Polymers produced from monomers substituted at the alpha carbon atom such as methacrylates, methacrylonitriles, and α-methylstyrene are thermally unstable and are known to depolymerize to their corresponding monomers at temperatures greater than 230° C. Above 300° C., poly(methyl methacrylate) (PMMA) depolymerizes rapidly at high conversions (>95%). Typical extruding and molding temperatures for such polymers are 200°–290° C. Significant depolymerization to the respective monomers would occur in this temperature range, thereby affecting the safety of the operation as well as the properties of the product. Polymethacrylates, and in particular PMMA, are the polymers from alpha-substituted monomers most widely used in commercial applications. In order to broaden the range of applications for these polymers, it is critical to improve their thermal stability.

In the manufacture of graft copolymers comprising a backbone of a propylene polymer material, to which is grafted PMMA, small amounts of non-methacrylate monomers such as methyl acrylate, butyl acrylate and styrene are typically copolymerized with the methyl methacrylate to improve thermal stability, since graft copolymers of methyl methacrylate and one or more of these monomers are much more stable to heat and undergo degradation at relatively higher temperatures. However, addition of these monomers affects the mechanical properties of the graft copolymers as well as the molecular weight and grafting efficiency.

Other methods have been proposed for improving the thermal stability of polymers of monomers substituted at the alpha carbon atom. For example, U.S. Pat. No. 6,046,273 describes a method for improving the thermal stability of graft copolymers of alpha-substituted acrylates by copolymerizing a 1–3 carbon alkyl-substituted acrylic acid with the alpha-substituted acrylate during the preparation of graft copolymers of a propylene polymer material. In addition, WO 00/08078 describes a method for further improving the thermal stability of acrylic grafted copolymers by polymerizing acrylic monomers onto a backbone of a propylene polymer material in the presence of a 4-vinyl-substituted 5–12 C cyclic 1-alkene.

Fluorinated polymers are characterized by resistance to harsh chemicals as well as stability toward heat, ultraviolet light, high energy radiation, and oxidation. Polyvinylidene fluoride, a member of the class of fluorinated polymers, is a semi-crystalline material with a high dielectric constant that can easily be processed on conventional molding and extrusion equipment. It also has high mechanical and impact strength, and high resistance to creep, fatigue and abrasion. Film made from this polymer has excellent oxygen and moisture barrier properties.

Fluorinated polymers have been blended with other polymers to improve properties. For example, U.S. Pat. No. 5,034,460 describes a composition comprising a vinylidene fluoride-based polymer, a graft copolymer formed from the graft polymerization of an alkyl methacrylate onto a fluorine-containing polymer, and at least one organic solvent. The resulting composition is reported to provide coatings having weather resistance, chemical stability, surface lubricity, and enhanced adhesion to substrates. Similarly, U.S. Pat. No. 5,188,873 describes a composition based on polyolefins containing at least one fluoropolymer and at least one low-density polyethylene, which can be employed for production of articles with improved optical properties when compared to compositions not containing a fluoropolymer.

Thus there is still a need for a method to increase the thermal stability of graft copolymers that include polymerized acrylic monomers substituted at the alpha-carbon atom while maintaining the physical properties of the graft copolymers.

SUMMARY OF THE INVENTION

The compositions of this invention comprise (1) a graft copolymer comprising a backbone of a propylene polymer material having graft polymerized thereto a monomer selected from the group consisting of (a) an ester of an acrylic acid substituted at the alpha carbon atom by a 1–3 alkyl group and (b) a combination of (i) an ester of an acrylic acid substituted at the alpha carbon atom by a 1–3 alkyl group and (ii) an ester of an unsubstituted acrylic acid, or an acrylic acid substituted at the alpha carbon atom by a 1–3 carbon alkyl group, and (2) about 1 weight % to about 25 weight % of a fluorinated olefin polymer, wherein the ratio of the polymerized monomer to the fluorinated olefin polymer is about 25:1 to about 0.5:1.

Also disclosed is a process for improving the thermal stability of a graft copolymer comprising blending (1) a graft copolymer comprising a backbone of a propylene polymer material having graft polymerized thereto a monomer selected from the group consisting of (a) an ester of an acrylic acid substituted at the alpha carbon atom by a 1–3 C alkyl group and (b) a combination of (i) an ester of an acrylic acid substituted at the alpha carbon atom by a 1–3 alkyl group and (ii) an ester of an unsubstituted acrylic acid, or an acrylic acid substituted at the alpha carbon atom by a 1–3 carbon alkyl group and (2) about 1 weight % to about 25 weight % of a fluorinated olefin polymer, wherein the ratio of the polymerized monomer to the fluorinated olefin polymer is about 25:1 to about 0.5:1.

DETAILED DESCRIPTION OF THE INVENTION

The propylene polymer material that is used as the backbone of the graft copolymer can be:

(a) a homopolymer of propylene having an isotactic index greater than 80, preferably about 85 to about 99;

(b) a copolymer of propylene and an olefin selected from the group consisting of ethylene and 4–10 C alpha-olefins, provided that when the olefin is ethylene, the maximum polymerized ethylene content is 10% by weight, preferably about 4%, and when the olefin is a 4–10 C alpha-olefin, the maximum polymerized content thereof is 20%, preferably about 16%, by weight, the copolymer having an isotactic index greater than 85;

(c) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:
  (i) about 10% to about 60% by weight, preferably about 15% to about 55%, of a propylene homopolymer having an isotactic index greater than 80, preferably about 85 to about 98, or a copolymer of monomers selected from the group consisting of (a) propylene and ethylene, (b) propylene, ethylene and a 4–8 C alpha-olefin, and (c) propylene and a 4–8 C alpha-olefin, the copolymer having a propylene content of more than 85% by weight, preferably about 90% to about 99%, and an isotactic index greater than 85;
  (ii) about 5% to about 25%, preferably about 5% to about 20%, of a copolymer of ethylene and propylene or a 4–8 C alpha-olefin that is insoluble in xylene at ambient temperature, and
  (iii) about 30% to about 70%, preferably about 20% to about 65%, of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene, and containing less than 70% by weight, preferably about 10% to about 60%, most preferably about 12% to about 55%, of ethylene and being soluble in xylene at ambient temperature, and having an intrinsic viscosity, measured in decahydronaphthalene at 135° C., of about 1.5 to about 4.0 dl/g, wherein the total amount of (ii) and (iii), based on the total olefin polymer composition, is about 50% to about 90%, the weight ratio of (ii)/(iii) is less than 0.4, preferably 0.1 to 0.3, and the composition is prepared by polymerization in at least two stages, and has a flexural modulus of less than 150 MPa; or (e) a thermoplastic olefin comprising:
  (i) about 10% to about 60%, preferably about 20% to about 50%, of a propylene homopolymer having an isotactic index greater than 80, or a copolymer of monomers selected from the group consisting of (a) ethylene and propylene, (b) ethylene, propylene, and a 4–8 C alpha-olefin, and (c) ethylene and a 4–8 C alpha-olefin, the copolymer having a polymerized propylene content greater than 85% and an isotactic index of greater than 85;
  (ii) about 20% to about 60%, preferably about 30% to about 50%, of an amorphous copolymer from monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a diene and containing less than 70% polymerized ethylene and being soluble in xylene at ambient temperature; and
  (iii) about 3% to about 40%, preferably about 10% to about 20%, of a copolymer of ethylene and propylene or a 4–8 C alpha-olefin that is insoluble in xylene at ambient temperature, wherein the thermoplastic olefin has a flexural modulus of greater than 150 but less than 1200 MPa, preferably about 200 to about 1100 MPa, most preferably about 200 to about 1000 MPa.

Room or ambient temperature is ~25° C.

4–8 C Alpha-olefins useful in the preparation of (d) and (e) include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Propylene polymer materials (d) and (e) can be prepared by polymerization in at least two stages, where in the first stage the propylene; propylene and ethylene; propylene and an alpha-olefin, or propylene, ethylene and an alpha-olefin are polymerized to form component (i) of (d) or (e), and in the following stages the mixtures of ethylene and propylene; ethylene and the alpha-olefin, or ethylene, propylene and the alpha-olefin, and optionally a diene, are polymerized to form components (ii) and (iii) of (d) or (e).

The polymerization can be conducted in liquid phase, gas phase, or liquid-gas phase using separate reactors, all of which can be done either by batch or continuously. For example, it is possible to carry out the polymerization of component (i) using liquid propylene as a diluent, and the polymerization of components (ii) and (iii) in gas phase, without intermediate stages except for the partial degassing of the propylene. All gas phase is the preferred method.

The preparation of propylene polymer material (d) is described in more detail in U.S. Pat. Nos. 5,212,246 and 5,409,992, which is incorporated herein by reference. The preparation of propylene polymer material (e) is described in more detail in U.S. Pat Nos. 5,302,454 and 5,409,992, which is incorporated herein by reference.

Propylene homopolymer is the preferred propylene polymer backbone material.

The monomers that can be graft polymerized onto the backbone of propylene polymer material include (a) an ester of an acrylic acid substituted at the alpha carbon atom by a 1–3 alkyl group and (b) a combination of (i) an ester of an acrylic acid substituted at the alpha carbon atom by a 1–3 alkyl group and (ii) an ester of an unsubstituted acrylic acid, or an acrylic acid substituted at the alpha carbon atom by a 1–3 carbon alkyl group. Methacrylic acid is the preferred substituted acrylic acid. Suitable esters include, for example, the methyl, ethyl, butyl, benzyl, phenylethyl, phenoxyethyl, epoxypropyl, and hydroxypropyl esters. Esters of 1–4 C alkanols are preferred. Methyl methacrylate is the most preferred ester of a substituted acrylic acid. The 3 carbon alkyl group can be linear or branched.

The total amount of polymerizable monomers is about 20 to about 150 parts, preferably about 30 to about 95 parts, per hundred parts of the propylene polymer material.

The graft copolymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced in the polymer as a result of the chemical or irradiation treatment form active grafting sites on the polymer and initiate the polymerization of the monomers at these sites. Graft copolymers produced by peroxide-initiated grafting methods are preferred.

During the graft polymerization, the monomers also polymerize to form a certain amount of free or ungrafted homopolymer or copolymer. The morphology of the graft copolymer is such that the propylene polymer material is the continuous or matrix phase, and the polymerized monomers, both grafted and ungrafted, are a dispersed phase.

Preparation of graft copolymers by contacting the propylene polymer with a free radical polymerization initiator such as an organic peroxide and a vinyl monomer is described in more detail in U.S. Pat. No. 5,140,074, which is incorporated herein by reference. Preparation of graft copolymers by irradiating an olefin polymer and then treating with a vinyl monomer is described in more detail in U.S. Pat. No. 5,411,994, which is incorporated herein by reference.

Fluorinated olefin polymers that can be used in the composition of this invention include, for example, polyvinylidene fluoride (PVDF), poly(hexafluoropropylene), fluorinated ethylene/propylene copolymers, poly (chlorotrifluoroethylene), and perfluoroalkoxyfluorocarbon resins. PVDF is preferred.

The fluorinated olefin polymer is present in an amount of about 1 weight percent to about 25 weight percent and the ratio of polymerized monomer to fluorinated olefin polymer is about 25:1 to about 0.5:1, preferably 10:1 to 0.5:1.

Blending the graft copolymer with the specified amount of fluorinated polyolefin improves the thermal stability and oxygen barrier properties of the graft copolymer, compared to the graft copolymer without the fluorinated polyolefin.

Compositions containing the graft copolymers of this invention can easily be impact-modified by the addition of one or more rubber components selected from the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) and (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin terpolymer rubbers such as ethylene/propylene/diene monomer rubbers (EPDM). The preferred olefin copolymer rubbers are ethylene/propylene, ethylene/butene-1, and ethylene/octene-1 copolymers. The olefin polymer rubbers can be produced with Ziegler-Natta or metallocene catalysts.

The monoalkenyl aromatic hydrocarbon-conjugated diene block copolymer can be a thermoplastic elastomer of the A-B (or diblock) structure, the linear A-B-A (or triblock) structure, the radial (A-B)n type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-butene/styrene triblock copolymers.

The weight average molecular weight (Mw) of the block copolymers generally will be in the range of about 45,000 to about 260,000 g/mole, average molecular weights in the range of about 50,000 to about 125,000 g/mole being preferred because they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of crosslinked rubber phase surrounded by a compatibilizing shell, normally a glassy polymer or copolymer. The core is typically a diene rubber such as butadiene or isoprene, or an acrylate. The shell is typically a polymer of two or more monomers selected from styrene, methyl methacrylate, and acrylonitrile. Particularly preferred core-shell rubbers have an acrylate core.

Suitable impact modifiers include, for example, Engage 8100, 8150, and 8200 ethylene/octene-1 copolymers, commercially available from DuPont Dow Elastomers; EPM 306P random ethylene/propylene copolymer, commercially available from Miles Inc., Polysar Rubber Division; Kraton G 1652 styrene/ethylene-butene/styrene triblock copolymer, commercially available from Shell Chemical Company; Exact ethylene/butene-1 copolymers, commercially available from Exxon Chemical Company, and KS080 and KS350 heterophasic olefin polymers, commercially available from Basell USA Inc.

The impact modifier, if present, is used in an amount of about 2% to about 30%, preferably about 5% to about 15%, by weight, based on the total weight of the composition.

The composition can also contain a broad molecular weight distribution ($M_w/M_n$ or MWD, where $M_w$ is the weight average molecular weight and $M_n$ is number average molecular weight) propylene polymer material (BMWD PP). The BMWD PP has a $M_w/M_n$ of about 5 to about 60, preferably about 5 to about 40; a melt flow rate (MFR) of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on a magnesium halide in active form. The polymerization process occurs in separate and consecutive stages, and in each stage polymerization takes place in the presence of the polymer produced in and the catalyst coming from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of a BMWD PP is described in more detail in U.S. Pat. No. 5,286,791, which is incorporated herein by reference.

The BMWD PP, if present, is used in an amount of about 10% to about 60%, preferably about 20% to about 50%, based on the total weight of the composition.

Other additives such as fillers and reinforcing agents, e.g., carbon black and chopped glass fibers, as well as inorganic powders such as calcium carbonate, talc, and mica; pigments; slip agents; waxes; oils; antiblocking agents, and antioxidants can also be present. If present, the amount of glass fiber is about 1% to 40%, preferably about 10% to 40%, based on the total weight of the composition. The glass fibers preferably have a maximum length of ½ inch. When glass fibers are used, a rubber component is typically present to improve processing.

A coupling agent is generally used with the glass fibers. The coupling agent can be, for example, polypropylene modified with an α,β-unsaturated carboxylic acid or an alicyclic carboxylic acid and derivatives thereof such as acrylic acid, methacrylic acid, maleic acid, fumaric acid, itaconic acid, endocyclo(2,2,1)-5-heptene-2,3-carboxylic acid and cis-4-cyclohexane-1,2-carboxylic acid, and anhydrides, esters, amides, and imides thereof. Polypropylenes modified with various amounts of maleic anhydride or maleic acid are preferred and are available commercially, for example, from Eastman Chemical Company and Aristech Chemical Corporation. The modified polypropylenes generally contain about 0.2% to about 10% of maleic acid or maleic anhydride, based on the total weight of the modified polymer. When present, the coupling agent is used in an amount of about 0.2% to about 4%, preferably about 0.5% to about 2%, based on the total weight of the composition.

The compositions of the present invention are prepared by mechanically blending the components in conventional mixing equipment, i.e., a single or twin screw extruder, Banbury mixer, or any other conventional melt compounding equipment. The order in which the components of the composition are mixed is not critical.

The compositions of this invention can be formed into useful articles by methods known in the art including thermoforming, injection molding, sheet extrusion, profile extrusion, and blow molding.

The test methods used to evaluate the molded specimens were:

| | |
|---|---|
| Young's modulus | ASTM D1708-96 |
| Notched Izod | ASTM D-256A |
| Tensile strength (Ten. Str.) | ASTM D-638-89 |
| Flexural modulus (Flex. Mod.) | ASTM D-790-86 |
| Flexural strength (Flex. Str.) | ASTM D-790-86 |
| Elongation to yield | ASTM D-638-89 |
| Elongation to break | ASTM D-638-89 |
| Melt flow rate, 230° C., 3.8 kg (graft copolymer) | ASTM 1238 |
| Melt flow rate, 230° C., 2.16 kg (propylene homopolymer) | ASTM 1238 |
| Film gas permeability | ASTM D-1434-82 |

Intrinsic viscosity is measured in decahydronaphthalene at 135° C.

Molecular weight measurements were made by gel permeation chromatography.

Isotactic index is defined as the percent of olefin polymer insoluble in xylene. The weight percent of olefin polymer soluble in xylene at room temperature is determined by dissolving 2.5 g of the polymer in 250 ml of xylene at room temperature in a vessel equipped with a stirrer, and heating at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

All heat aging tests were done at 150° C. In the tables, samples that lost their integrity and could not be tested were marked "Fail".

All percentages and parts are by weight in this specification unless otherwise specified.

EXAMPLES 1–6

Comparative Examples 7–8

These examples describe a method for preparing the composition of this invention, comparative materials, and the resulting compositions.

A propylene homopolymer in spherical form having a MFR of 8–10 g/10 min at 230° C. and 2.16 kg, and 96.5% insolubles in xylene at room temperature was used as the propylene polymer material backbone.

The monomers (95.6% MMA and 4.4% MeAc, based on the total weight of the monomers) were grafted onto the propylene homopolymer backbone at a graft polymerization temperature of 114–115° C. using the previously described peroxide-initiated graft polymerization process. For graft copolymer 1 (see Table 1), fifty parts by weight of monomer were added per 100 parts of propylene homopolymer. Lupersol PMS 50% t-butyl peroxy-2-ethyl hexanoate in mineral spirits, commercially available from Elf Atochem, was used as the peroxide initiator. The monomers were fed at a rate of 1 pph/min for 50 minutes. A monomer to initiator molar ratio of 120 was used. After the addition of monomers the temperature was raised to 140° C. for 120 minutes under a nitrogen purge until the amount of unreacted MMA in the product was <500 parts per million.

Graft copolymer 2 (see Table 1) was made in a similar manner except that ninety-five parts by weight of monomer were added per 100 parts of propylene homopolymer. The same initiator and monomer to initiator molar ratio were used as in the preparation of graft copolymer 1. The monomers were fed at a rate of 1 pph/min for 95 minutes. After the addition of monomers, the temperature was raised to 140° C. for 60–120 minutes under a nitrogen purge until the amount of unreacted MMA in the product was <500 parts per million.

One of two rubbers was added. Rubber 1 (see Table 1) was Engage 8100 ethylene/octene-1 copolymer containing 24% polymerized octene-1. Rubber 2 was Engage 8150 ethylene/octene-1 copolymer containing 25% polymerized octene-1. Both rubbers are commercially available from DuPont-Dow Elastomers.

One of two fluorinated olefin polymers was added. PVDF 1 (see Table 1) was Hylar 460 polyvinylidene fluoride having a melting point of 158° C. PVDF 2 (see Table 1) was Hylar MP-20 polyvinylidene fluoride having a melting point of 167° C. Both are commercially available from Ausimont USA, Inc.

0.4% Calcium carbonate and 0.2% Irganox B-225 antioxidant, a blend of 1 part Irganox 1010 stabilizer and 1 part Irgafos phophite stabilizer, both commercially available from Ciba Specialty Chemicals Corporation, were added to each of the formulations in Table 1.

PMMA (wt. %) represents the weight percent of PMMA in the final blends. PMMA/PVDF is the ratio of PMMA to PVDF in the final blends.

The ingredients of the Examples and Comparative Examples were compounded on a 30 mm Leistritz twin screw extruder at a temperature of 220° C., a screw speed of 300 rpm, and a throughput rate of 25 lb/hr, and pelletized.

ASTM test bars were molded on a 5 oz Battenfeld molding machine and tested for physical properties. Other test bars were subjected to heat aging in a convection oven at 150° C. Tensile tests were conducted after 150, 300, and 500 hours using an Instron tester.

The results are shown in Table 1. The data showed improved thermal stability in the Example specimens compared to Comparative Example specimens without the fluorinated olefin polymer.

TABLE 1

|  | Examples | | | | | | Comparative Examples | |
| --- | --- | --- | --- | --- | --- | --- | --- | --- |
|  | 1 | 2 | 3 | 4 | 5 | 6 | 7 | 8 |
| Graft copolymer 1 (wt. %) | 82.8 | 88.8 | 62.0 | 0.0 | 0.0 | 0.0 | 93.0 | 0.0 |
| Graft copolymer 2 (wt. %) | 0.0 | 0.0 | 0.0 | 88.2 | 75.1 | 83.1 | 0.0 | 100 |
| Rubber 1 (wt. %) | 6.8 | 6.8 | 7.0 | 0.0 | 0.0 | 0.0 | 7.0 | 0.0 |
| Rubber 2 (wt. %) | 0.0 | 0.0 | 0.0 | 7.5 | 7.0 | 7.0 | 0.0 | 0.0 |
| PVDF 1 (wt. %) | 10.4 | 4.4 | 31.0 | 0.0 | 0.0 | 0.0 | 0.0 | 0.0 |
| PVDF 2 (wt. %) | 0.0 | 0.0 | 0.0 | 4.3 | 17.9 | 9.9 | 0.0 | 0.0 |
| PMMA (wt. %) | 27.55 | 29.56 | 20.56 | 43.07 | 36.49 | 40.36 | 30.96 | 48.55 |
| PMMA/PVDF | 2.65 | 6.72 | 0.67 | 10.05 | 2.05 | 4.10 | — | — |
| Properties |  |  |  |  |  |  |  |  |
| MFR, g/min |  |  |  | 3.4 | 3.3 | 3.0 |  | 3.9 |
| Notched Izod Imp. (ft-lb/in) | 1.37 | 1.63 | 1.2 | 0.72 | 0.66 | 0.74 | 2.22 | 0.41 |
| Ten. Str. @ yld. (psi) | 3712 | 3698 | 3292 | 4495 | 4524 | 4452 | 3828 | 5321 |
| Flex. Mod. (kpsi) | 238 | 253 | 202 | 237 | 235 | 217 | 254 | 291 |
| Oven Aging @ 150° C. |  |  |  |  |  |  |  |  |
| Ten. Str. @ Yld. (psi) |  |  |  |  |  |  |  |  |
| 150 hours | 4771 | 4814 | 4553 | 4814 | 4829 | 4727 | 4698 | 6003 |
| 300 hours | 4756 | 4828 | 4655 | 4756 | 4814 | 4727 | 4814 | 4147 |
| 500 hours | 4321 | 1117 | 4524 | 4742 | 4756 | 4669 | Fail | Fail |

EXAMPLES 9–13

Comparative Example 14

These examples describe the preparation of other compositions of this invention and of a comparative composition.

The graft copolymer used in these examples was the same as graft copolymer 2 in Example 4.

The fluorinated olefin polymer used in these examples was the same as PVDF 2 in Examples 1–6.

The rubber used in these examples was the same as Rubber 2 in Example 4.

The broad molecular weight propylene homopolymer used in these Examples had a MFR of 20 g/10 min and a MWD of 7–8 and is commercially available from Basell USA Inc.

The neutralizer used in this example was Pationic 1240, modified calcium salt derived from lactic acid. Pationic 1240 is commercially available from Patco Polymer Additives Division, American Ingredients Company.

The stabilizer used in these examples was Irganox LC20FF, which is a 50/50 blend of Irganox 1010, a hindered phenolic antioxidant, and Irgafos 12 stabilizer, a hydrolytically stable phosphite. Irganox LC20FF stabilizer is commercially available from Ciba Specialty Chemicals Corporation.

The compositions and the test specimens were made in the same way as described in Examples 1–6.

The results are shown in Table 2. The data show that the physical properties of the specimens containing fluorinated olefin polymer were retained even after 500 hours of oven aging at 150°.

TABLE 2

|  | Examples | | | | | Comparative Examples |
| --- | --- | --- | --- | --- | --- | --- |
|  | 9 | 10 | 11 | 12 | 13 | 14 |
| BMWD PP (wt. %) | 49.4 | 48.9 | 47.1 | 43.4 | 41.6 | 49.9 |
| Graft copolymer 2 (wt. %) | 44.4 | 44.0 | 42.3 | 39.0 | 37.4 | 44.8 |
| Rubber 2 (wt. %) | 4.9 | 4.9 | 4.7 | 4.3 | 4.1 | 5.0 |
| PVDF 2 (wt. %) | 1.0 | 1.9 | 5.6 | 13.0 | 16.6 | 0.0 |
| Stabilizer (wt. %) | 0.2 | 0.2 | 0.2 | 0.2 | 0.2 | 0.2 |
| Neutralizer (wt. %) | 0.1 | 0.1 | 0.1 | 0.1 | 0.1 | 0.1 |
| PMMA (wt. %) | 21.65 | 21.44 | 20.63 | 19.02 | 18.22 | 21.86 |
| PMMA/PVDF | 22 | 11 | 3.7 | 1.5 | 1.1 | — |
| Properties |  |  |  |  |  |  |
| MFR (g/min) | 7.4 | 6.2 | 7.7 | 7.0 | 7.6 | 8.1 |
| Notched Izod Imp. (ft-lb/in) | 0.94 | 0.92 | 0.67 | 0.44 | 0.41 | 0.88 |
| Flex. Mod. (kpsi) | 286 | 283 | 295 | 287 | 281 | 289 |
| Flex. Str. (psi) | 8010 | 7987 | 8278 | 8050 | 7877 | 8018 |
| Ten. Str. @ Yld. (psi) | 5339 | 5359 | 5367 | 5138 | 4979 | 5324 |
| Elongation @ Yld. (%) | 4.3 | 4.3 | 3.5 | 3.3 | 3.3 | 4.4 |
| Density (kg/cm) | 957 | 962 | 980 | 1012 | 1029 | 952 |
| Oven Aging @ 150° C. |  |  |  |  |  |  |

TABLE 2-continued

|  | Examples | | | | | Comparative Examples |
|---|---|---|---|---|---|---|
|  | 9 | 10 | 11 | 12 | 13 | 14 |
| Ten. Str. @ Yld. (psi)/elong (%) | | | | | | |
| 100 hours | 5245/2.9 | 5260/2.9 | 5160/2.6 | 4993/2.5 | 4859/2.4 | 5206/2.9 |
| 250 hours | 5190/3.0 | 5195/2.9 | 5129/2.6 | 4960/2.5 | 4810/2.4 | 5140/3.0 |
| 500 hours | 5199/2.7 | Not measured | 5200/2.6 | 5020/2.5 | 4880/2.4 | Fail |
| 1000 hours | Fail | Fail | 2000/1.0 | Fail | Fail | Fail |

EXAMPLES 15 AND 16

These examples describe the preparation of glass fiber reinforced compositions of this invention.

The graft copolymer used in these examples was the same as graft copolymer 2 in Example 4.

The fluorinated olefin polymer used in these examples was the same as PVDF 2 in Example 4.

The rubber used in these examples was the same as Rubber 2 in Example 4.

The broad molecular weight propylene homopolymer used in these examples had a MFR of 1 g/10 min, xylene solubles of ~1.5%, and $M_w/M_n$ of ~5 and is commercially available from Basell USA Inc.

Pationic 1240 neutralizer and Irganox LC20FF stabilizer were described in Examples 9–13.

The hindered amine stabilizers Tinuvin 328, Tinuvin 770, and Chimassorb 119 were also added to the compositions in these examples. The stabilizers are all commercially available from CIBA Specialty Chemicals Corporation.

The glass fiber used in these examples was PPG 3793 having a diameter of 10 μm and a length of ⅛", coated with an aminosilane coupling agent. The add level was 35 parts of glass fiber to 100 parts of the total composition. PPG 3793 glass fiber is commercially available from PPG Industries Inc.

The coupling agent used in this example was Unite MP1000, a maleic anhydride-grafted polypropylene that is commercially available from Aristech Chemical Corporation.

The compositions were made and the test specimens were prepared in the same way as in Examples 1–6.

The results are shown in Table 3. The data show that the decrease in tensile strength of the specimen containing fluorinated olefin polymer was less than the specimen that did not contain a fluorinated olefin polymer.

TABLE 3

|  | Examples | |
|---|---|---|
|  | 15 | 16 |
| Graft copolymer (wt. %) | 34.83 | 33.85 |
| BMWD PP (wt. %) | 16.07 | 15.55 |
| Coupling agent (wt. %) | 4.55 | 4.26 |
| Rubber 2 (wt. %) | 17.10 | 16.37 |
| PVDF 2 (wt. %) | 0.00 | 2.78 |
| Stabilizer (wt. %) | 0.15 | 0.12 |
| Neutralizer (wt. %) | 0.04 | 0.04 |

TABLE 3-continued

|  | Examples | |
|---|---|---|
|  | 15 | 16 |
| Tinuvin 328 (wt. %) | 0.15 | 0.12 |
| Tinuvin 770 (wt. %) | 0.22 | 0.17 |
| Chimassorb 119 (wt. %) | 0.59 | 0.50 |
| Calcium carbonate (wt. %) | 0.38 | 0.32 |
| Glass fiber (wt. %) | 25.92 | 25.92 |
| Oven Aging @ 150° C. | | |
| Ten. Str. @ Yld. (psi) | | |
| 100 hours | 13356 (13006 @ 23° C.) | 12520 (12060 @ 23° C.) |
| 250 hours | 10470 (10038 @ 23° C.) | 13031 (12877 @ 23° C.) |
| 500 hours | 12860 (12550 @ 23° C.) | 12596 (12387 @ 23° C.) |
| 1000 hours | 12444 (12680 @ 23° C.) | 12347 (12566 @ 23° C.) |
| Decrease in Ten. Str. after 1000 hours at 150° C. (%) | 6.8 (2.5 @ 23° C.) | 1.38 (0 @ 23° C.) |

EXAMPLES 17–19

Comparative Examples 20–21

These examples describe the preparation of films from the olefin compositions of the invention and other comparative compositions.

The graft copolymer and the fluorinated olefin polymer used in these examples were the same as in Example 4.

The rubber used in these examples was the same as Rubber 2 in Example 4.

The broad molecular weight propylene homopolymer, the neutralizer, and the stabilizer used in these examples were the same as in Example 9.

The propylene homopolymer designated PP has a MFR of 4 g/10 min. and is commercially available from Basell USA Inc.

The compositions were compounded in the same way as in Examples 1–6.

The polymer pellets were used to extrude a sheet of ~25 mil thickness, from which 2"×2" plaque s were cut. The plaques were secured in a clamp on T. M. Long equipment. The sample was heated to 145–160° C. and stretched biaxially at a stretch ratio of 5/1 in both directions.

The composition of the samples and the film properties are shown in Table 4. The data show that oxygen transmission through films made from the compositions of the invention containing fluorinated olefin polymer was at least 18% lower than for the compositions without a fluorinated olefin polymer.

TABLE 4

|  | Examples | | | Comparative Examples | |
| --- | --- | --- | --- | --- | --- |
|  | 17 | 18 | 19 | 20 | 21 |
| PP (wt. %) | 0 | 0 | 0 | 100 | 0 |
| Graft copolymer (wt. %) | 44.86 | 43.15 | 41.57 | 0 | 0 |
| BMWD PP (wt. %) | 49.85 | 47.95 | 46.19 | 0 | 100 |
| Rubber (wt. %) | 5.04 | 4.85 | 4.67 | 0 | 0 |
| PVDF (wt. %) | 0.00 | 3.81 | 7.34 | 0 | 0 |
| Stabilizer (wt. %) | 0.20 | 0.19 | 0.19 | 0 | 0 |
| Neutralizer (wt. %) | 0.05 | 0.05 | 0.04 | 0 | 0 |
| Film Properties | | | | | |
| Young's modulus (kpsi) | 404.6 | 352.4 | 324.8 | 327.7 | 403.1 |
| Tensile @ Break (kpsi) | 24.9 | 25.2 | 23.9 | 26.2 | 27.8 |
| Elongation @ Break (%) | 78 | 87 | 106 | 107 | 116 |
| Oxygen TR (cc.mil/m$^2$.day) | 872 | 690 | 710 | 1960 | 1582 |

Other features, advantages and embodiments of the invention described herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A composition comprising, by weight:

(1) a graft copolymer comprising a backbone of a propylene polymer material grafted with a polymerized monomer which is made by polymerization of a monomer selected from the group consisting of (a) an ester of an acrylic acid substituted at the alpha carbon atom by a 1–3 alkyl group and (b) a combination of (i) an ester of an acrylic acid substituted at the alpha carbon atom by a 1–3 alkyl group and (ii) an ester of an unsubstituted acrylic acid, or an acrylic acid substituted at the alpha carbon atom by a 1–3 carbon alkyl group, and (2) about 1 weight % to about 25 weight % of a fluorinated olefin polymer, wherein the ratio of the polymerized monomer to the fluorinated olefin polymer is about 25:1 to about 0.5:1;

wherein the propylene polymer material is selected from:

(I) a homopolymer of propylene having an isotactic index greater than 80;

(II) a copolymer of propylene and an olefin selected from the group consisting of ethylene and 4–10 C alpha-olefins, provided that when the olefin is ethylene, the maximum polymerized ethylene content is about 10% and when the olefin is a 4–10 C alpha-olefin, the maximum polymerized content thereof is about 20% by weight, the copolymer having an isotactic index greater than 85;

(III) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(IV) an olefin polymer composition comprising:

(a) about 10% to about 60% by weight of a propylene homopolymer having an isotactic index greater than 80, or a copolymer of monomers selected from the group consisting of (i) propylene and ethylene, (iii) propylene, ethylene and a 4–8 C alpha-olefin, and (iii) propylene and a 4–8 C alpha-olefin, the copolymer having a polymerized propylene content of more than 85% by weight and an isotactic index greater than 85;

(b) about 5% to about 25% by weight of a copolymer of ethylene and propylene or a 4–8 C alpha-olefin that is insoluble in xylene at ambient temperature; and (c) about 30% to about 70% by weight of an elastomeric copolymer of monomers selected from the group consisting of (i) ethylene and propylene.

(ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g, wherein the total amount of (b) and (c), based on the total olefin polymer composition, is about 50% to about 90%, the weight ratio of (b)/(c) is less than 0.4, and the composition is prepared by polymerization in at least two stages and has a flexural modulus of less than 150 Mpa; and (V) a thermoplastic olefin comprising:

(a) about 10% to 60%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;

(b) about 20% to about 60% of an amorphous copolymer from monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and (c) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 Mpa.

2. The composition of claim 1 wherein the propylene polymer material is a propylene homopolymer.

3. The composition of claim 1 wherein the monomer is a combination of methyl methacrylate and methyl acrylate.

4. The composition of claim 1 that additionally comprises (3) about 3 weight % to about 25 weight %, based on the total weight of the composition, of at least one rubber component selected from the group consisting of (a) an olefin copolymer rubber, (b) a monoalkenyl aromatic hydrocarbon-conjugated diene block copolymer, and (c) a core-shell rubber, wherein (1)+(2)+(3)=100 weight percent.

5. The composition of claim 1 that additionally comprises (4) about 10% to about 60%, based on the total weight of the composition, of a broad molecular weight distribution propylene polymer material, wherein (1)+(2)+(4)=100 weight percent.

6. The composition of claim 4 that additionally comprises (4) about 10% to about 60%, based on the total weight of the composition, of a broad molecular weight distribution propylene polymer material, wherein (1)+(2)+(3)+(4)=100 weight percent.

7. The composition of claim 1 that additionally comprises about 1% to about 40%, based on the total weight of the composition, of glass fibers having a maximum length of ½ inch.

8. The composition of claim 4 that additionally comprises about 1% to about 40%, based on the total weight of the composition, of glass fibers having a maximum length of ½ inch.

9. The composition of claim 1 wherein the ratio of the polymerized monomer to the fluorinated polymer is 10:1 to 0.5:1.

10. A process for improving the thermal stability of a graft copolymer comprising blending
    (1) a graft copolymer comprising a backbone of a propylene polymer material grafted with a polymerized monomer which is made by polymerization of a monomer selected from the group consisting of (a) an ester of an acrylic acid substituted at the alpha carbon atom by a 1–3 alkyl group and (b) a combination of (i) an ester of an acrylic acid substituted at the alpha carbon atom by a 1–3 alkyl group and (ii) an ester of an unsubstituted acrylic acid, or an acrylic acid substituted at the alpha carbon atom by a 1–3 carbon alkyl group, and
    (2) about 1 weight % to about 25 weight % of a fluorinated olefin polymer, wherein the ratio of the polymerized monomer to the fluorinated olefin polymer is about 25:1 to about 0.5:1;
wherein the propylene polymer material is selected from:
(1) a homopolymer of propylene having an isotactic index greater than 80;
    (2) a copolymer of propylene and an olefin selected from the group consisting of ethylene and 4–10 C alpha-olefins, provided that when the olefin is ethylene, the maximum polymerized ethylene content is about 10% and when the olefin is a 4–10 C alpha-olefin, the maximum polymerized content thereof is about 20% by weight, the copolymer having an isotactic index greater than 85;
    (3) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
    (4) an olefin polymer composition comprising:
        (a) about 10% to about 60% by weight of a propylene homopolymer having an isotactic index greater than 80, or a copolymer of monomers selected from the group consisting of (i) propylene and ethylene, (iii) propylene, ethylene and a 4–8 C alpha-olefin, and (iii) propylene and a 4–8 C alpha-olefin, the copolymer having a polymerized propylene content of more than 85% by weight and an isotactic index greater than 85;
        (b) about 5% to about 25% by weight of a copolymer of ethylene and propylene or a 4–8 C alpha-olefin that is insoluble in xylene at ambient temperature; and
        (c) about 30% to about 70% by weight of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g,
    wherein the total amount of (b) and (c), based on the total olefin polymer composition, is about 50% to about 90%, the weight ratio of (b)/(c) is less than 0.4, and the composition is prepared by polymerization in at least two stages and has a flexural modulus of less than 150 Mpa; and
(5) a thermoplastic olefin comprising:
    (a) about 10% to 60%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
    (b) about 20% to about 60% of an amorphous copolymer from monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
    (c) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 Mpa.

11. The process of claim 10 that additionally comprises blending (1) and (2) with (3) about 3 weight % to about 25 weight %, based on the total weight of the composition, of at least one rubber component selected from the group consisting of (a) an olefin copolymer rubber, (b) a monoalkenyl aromatic hydrocarbon-conjugated diene block copolymer, and (c) a core-shell rubber, wherein (1)+(2)+(3)=100 weight percent.

12. The process of claim 10 that additionally comprises blending (1) and (2) with (4) about 10% to about 60%, based on the total weight of the composition, of a broad molecular weight distribution propylene polymer material, wherein (1)+(2)+(4)=100 weight percent.

13. The process of claim 11 that additionally comprises blending (1), (2), and (3) with (4) about 10% to about 60%, based on the total weight of the composition, of a broad molecular weight distribution propylene polymer material, wherein (1)+(2)+(3)+(4)=100 weight percent.

14. The process of claim 10 that additionally comprises blending (1) and (2) with (5) about 1% to about 40%, based on the total weight of the composition, of chopped glass fibers having a maximum length of ½ inch, wherein (1)+(2)+(5)=100 weight percent.

15. The process of claim 11 that additionally comprises blending (1), (2), and (3) with (5) about 1% to about 40%, based on the total weight of the composition, of chopped glass fibers having a maximum length of ½ inch, wherein (1)+(2)+(3)+(5)=100 weight %.

* * * * *